United States Patent [19]

Stinson

[11] 4,352,417
[45] Oct. 5, 1982

[54] CONTROL VALVE FOR SHOCK ABSORBER PISTONS AND THE LIKE

[75] Inventor: Jonathan D. Stinson, Detroit, Mich.

[73] Assignee: Ford Motor Company, Dearborn, Mich.

[21] Appl. No.: 193,555

[22] Filed: Oct. 3, 1980

[51] Int. Cl.³ .............................................. F16F 9/50
[52] U.S. Cl. ............................ 188/322.15; 137/513.5; 137/513.7
[58] Field of Search .......... 188/282, 281, 317, 322.15, 188/322.13, 322.22, 322.16, 322.17, 322.18; 137/513.3, 513.5, 513.7

[56] References Cited

U.S. PATENT DOCUMENTS

| 2,699,844 | 1/1955 | McIntyre | 188/282 |
| 2,753,888 | 7/1956 | Glassford | 137/513.7 |
| 3,194,262 | 7/1965 | Hamilton et al. | 137/513.3 X |
| 3,605,801 | 9/1971 | De Carbon | 137/513.7 |
| 3,621,951 | 11/1971 | Schmid | 188/322.15 |
| 3,756,357 | 9/1973 | Graff et al. | 188/282 |
| 3,791,407 | 2/1974 | Nicholls | 137/513.3 X |
| 3,837,445 | 9/1974 | Pierle | 188/282 X |
| 3,844,389 | 10/1974 | De Carbon | 188/322.15 |
| 3,981,380 | 9/1976 | Andre | 188/282 |

FOREIGN PATENT DOCUMENTS 2751046 12/1978 Fed. Rep. of Germany ...... 188/282

Primary Examiner—Douglas C. Butler
Attorney, Agent, or Firm—Steven L. Permut; Clifford L. Sadler

[57] ABSTRACT

A dual action piston assembly 10 includes a piston 12 with compression passageways 18 and rebound passageways 20 with each set of passageways covered by a valve disc 22 and 24 respectively. Each valve disc is seated on a land by a spring biased valve seat 26 and 28 respectively. The rebound valve seat 28 has a debossed section 34 which is spaced away from the valve disc 24 to form a clearance 36 such that when fluid pressure within rebound passageway 20 presses against valve disc 24, the valve disc portion under the debossed section 34 flexes to modulate fluid flow before the valve seat 28 lifts from a higher pressure within the rebound passageway against a spring 42 to allow for smooth modulation of hydraulic fluid passing therethrough.

6 Claims, 3 Drawing Figures

CONTROL VALVE FOR SHOCK ABSORBER PISTONS AND THE LIKE

BACKGROUND OF THE INVENTION

This invention relates to fluid flow control valves and more particularly to a shock absorber piston having fluid passages therethrough and incorporating a valve assembly.

DISCLOSURE INFORMATION

Hydraulic shock absorbers are commonly designed with a piston slideably mounted within a working cylinder. The piston often incorporates a control valve which modulates the flow of fluid through passages in the piston. The control valve modulation affects the shock absorbing capabilities of the particular shock absorber.

Control valve constructions have incorporated fluid ports passing through the piston and capped by a flexible annular valve disc which sits on a valve seat about the passage. The disc is flexible to flex away from the passage when sufficient fluid pressure is within the passage to allow fluid flow through the passage. U.S. Pat. No. 2,753,888 issued to Glassford on July 10, 1956 discloses an example of the above.

Other control valves include a second spring loaded valve abutting the opposite side of the valve disc to insure that it properly closes. U.S. Pat. No. 2,699,844 issued to McIntyre on Jan. 18, 1955 discloses a second seat which biases the valve to its closed position.

Other valve constructions have the second valve seat spaced away from the valve disc to allow the valve disc to freely open up a predetermined amount before abutting the valve seat. U.S. Pat. No. 3,837,445 issued to Pierle on Sept. 24, 1974; U.S. Pat. No. 3,756,357 issued to Graff et al on Sept. 4, 1973; U.S. Pat. No. 3,791,407 issued to Nicholls on Feb. 12, 1974; and U.S. Pat. No. 3,844,389 issued to de Carbon on Oct. 29, 1974 all disclose the second valve seat spaced away from the valve disc.

In addition, present control valves have an open bleed port which allows for minimal fluid flow through the passage even if the valve disc is not lifted from its piston seat. The Graff et al, De Carbon and Nicholls references disclose apertures in the valve disc. The Pierle reference discloses notches within the piston valve seat.

U.S. Pat. No. 3,194,262 issued to Hamilton et al on July 13, 1965 discloses a base valve for a shock absorber that has a second valve seat biased to close the valve disc onto the first valve seat. The first valve seat has notches therein to provide for a minimal fluid flow when the valve disc is seated thereon.

U.S. Pat. No. 3,621,951 issued to Schmid on Nov. 23, 1971 discloses an elastomeric heat expandable valve seat which changes its distance away from the valve discs depending upon the temperature.

A rebound control valve is needed that provides a transitional phase between the bleed phase disclosed in the de Carbon, Nicholls, Graff et al, Hamilton and Pierle references and spring seat lifting phase at high pressures as disclosed in the Graff et al reference.

SUMMARY OF THE DISCLOSURE

According to the invention, a control valve is mounted on a piston for a hydraulic shock absorber to modulate fluid flow through passages in the piston during the rebound stroke of the piston. The piston has an integral circular land which circumscribes passageways through the piston. A flexible valve disc is seated on the land and covers the passageway. The land has notches in it to provide a bleed past the valve disc. A moveable valve seat is resiliently biased to abut against an opposing side of the valve disc. The moveable valve seat is annular in shape and a portion of it is spaced away from the valve disc.

When pressure in the passageway begins to rise, an initial amount of fluid is allowed to bleed by the valve disc by passing through the notches in the land. Subsequently, the section of valve disc interposed between the spaced sections spaced sections of the second valve seat and the land flexes away from the land on the piston to allow the fluid within the passageways to escape therefrom and pass by the valve disc. Upon a predetermined increase in pressure in the passageways, the pressure lifts the whole valve disc against the biasing force of the moveable valve seat. Upon a decrease in pressure, the moveable valve seat is biased to return back to its seated position and upon a further decrease in pressure the valve disc becomes fully seated on the land.

The allowance of the valve disc to flex in portions allows for a smooth modulation of fluid flow through the passages and piston while the presence of the spaced portions of the moveable valve seat functions as a stop to insure the valve disc does not overflex and lose its structural integrity.

BRIEF DESCRIPTION OF THE DRAWINGS

Reference now will be made to the following drawings in which.

DETAILED DESCRIPTION OF PREFERRED EMBODIMENT

Figure 1:
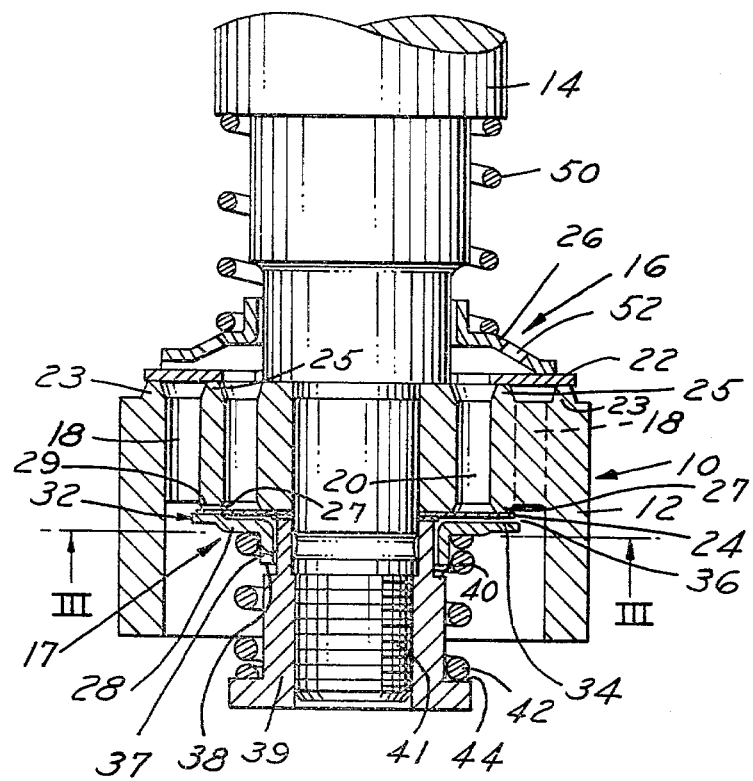
FIG. 1 is a side elevational partially segmented view of a piston assembly incorporating an embodiment of the invention.

As shown in FIG. 1, the piston assembly 10 includes a piston 12 mounted on the end of a piston rod 14. A jounce control valve assembly 16 and a rebound control valve assembly 17 control fluid flow through two sets of passageways 18 and 20 respectively in the piston 12. Each control valve assembly 16 and 17 includes valve discs 22 and 24 which are biased against lands 23, 25 and 27 to close the respective passages 18 and 20 by a moveable upper valve seat 26 and a moveable lower valve seat 28. The land 27 has a series of four shallow notches 29 (only one shown) which are approximately 0.187 inches wide and 0.00425 inches deep.

Figure 2:
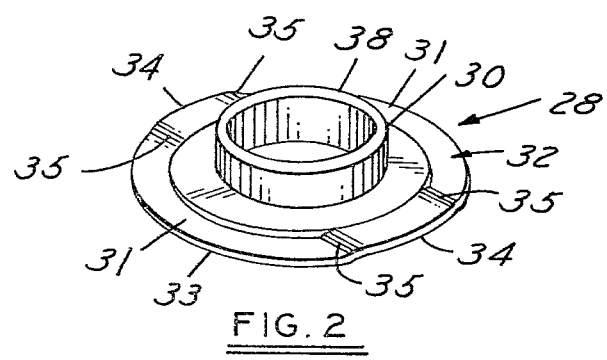
FIG. 2 is a perspective view of the rebound valve seat shown in FIG. 1.

As more clearly shown in FIG. 2, the moveable valve seat 28 of the rebound control valve assembly 17 has a central cylindrical portion 30 and an outward peripheral seating portion 32 with a seating surface 33 that engages the radially outer portion of said valve disc 24. The seating portion 32 has two flat sections 31 interposed between two debossed sections 34. When the peripheral seating portion has its surface 33 seated against the valve disc 24, as shown in FIG. 1, the debossed section 34 provides for a slight clearance 36 between the valve seat surface 33 and the valve disc 24 to allow the valve disc 24 to flex therein. The valve disc 24 is made from flapper quality spring steel of approximately 0.006–0.008 inch thick to permit sufficient flexibility of the disc 24 when used in a typical passenger car shock absorber.

The cylindrical wall section 30 fits about a narrow cylindrical section 37 of a fastener 39 which is threaded onto end 41 of rod 14. The end 38 of cylindrical section 30 is spaced from shoulder 40 at the end of the narrow cylindrical section 37 when the valve seat 28 is seated to provide space for the valve seat to move axially along rod 14. A valve spring 42 is seated between spring seat 44 on fastener 16 and the valve seat 28 to bias the valve seat against disc 24.

Figure 3:
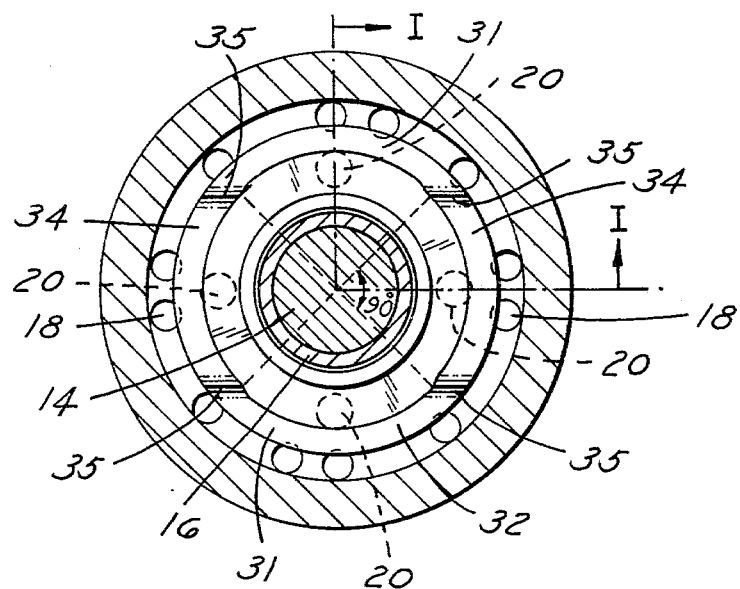
FIG. 3 is a cross-sectional view of a piston rod assembly taken along the line 3—3 in FIG. 1.

As shown in FIG. 3, the four rebound passages 20, are circumferentially spaced 90° from each other. Each debossed section 34 extends to edges 35 to span at least a 90° angle about the peripheral seating portion 32 such that at least one passage 20 will be in conjunction with each debossed valve section 34 regardless of the rotated position the valve seat 20 is secured onto the piston.

In operation, when the piston 12 undergoes a compression stroke, fluid passes through passageways 18 and when pressure builds up sufficiently, it lifts the valve disc 22 against the downward bias of valve seat 26 caused by the upper valve spring 50. During the rebound stroke of piston 12, the valve disc 22 closes passageways 18 and fluid is directed through apertures 52 in the upper valve seat 26 and through passageways 19 in piston 12. Initially, fluid bleeds through notches 29 in land 27. As the pressure builds slightly, the section of valve disc 24 aligned with the debossed section 34 flexes to abut surface 33 at debossed section 34 and allows increased flow from passageways 20. As the pressure in passageways 19 further increases, the valve seat 28 is then moved against the bias of spring 42 until the end 38 abuts the shoulder 40 of nut 16.

The debossed section 34 of the rebound valve seat 28 in conjunction with the rebound valve disc 24 allows for a smooth transition between the bleeding upon commencement of the rebound stroke and the lifting of valve seat 28. The smooth transition provides for improved modulation of fluid flow thereby decreasing any jerky or abrupt motions during the rebound stroke. The surface 33 at debossed section 34 also functions as a stop to assure that the valve disc 24 does not overflex and the structural integrity of the valve disc 24 is maintained.

Variations and modifications of the present invention are possible without departing from its spirit and scope as defined by the appended claims.

The embodiments in which an exclusive property or privilege is claimed are defined as follows:

1. A piston rebound control valve for controlling the flow of liquid through a rebound passageway in a piston housing comprising:
   a flexible valve disc covering said passageway;
   a valve seat abutting said valve disc when said disc is in a seated position thereagainst;
   a biasing means for resiliently biasing said valve seat against said valve disc;
   said valve seat having a debossed section spaced away from said seated valve disc when said disc is in its seated position;
   said valve disc constructed to flex toward said debossed section of said valve seat in response to a predetermined pressure in said passageway to provide initial flow from said passageway by said valve disc, said predetermined pressure being less than the pressure needed to lift said valve seat against its biasing means.

2. A control valve as defined in claim 1 wherein:
   said valve seat has two debossed sections comprising circumferentially spaced arcuate sections separated from said seated valve disc; and
   flat sections of said second valve seat are circumferentially interposed between said debossed sections.

3. A control valve as defined in claim 2 wherein said valve seat is annular in shape and engageable with the radially outer portion of said valve disc.

4. A control valve as defined in claim 3 wherein:
   said piston has rebound passageways circumferentially spaced thereabout;
   said arcuate debossed sections arcuately extending an angle equal to the arcuate angle between the circumferentially spaced rebound passageways such that at least one passageway is situated under a valve disc piston section that is aligned under a said arcuate debossed section of said valve seat.

5. A control valve as defined in claims 1, 2, 3 or 4 wherein said valve disc comprises steel and is approximately 0.006 to 0.008 inches thick.

6. A control valve as defined in claim 1 wherein:
   a land surrounds said rebound passageway;
   said biasing means biases said valve disc to sit on said land;
   at least one notch extends through said land to provide a port for bleeding of fluid from said passageway when said valve disc is seated on said land.

* * * * *